(12) United States Patent
Shirai et al.

(10) Patent No.: US 7,592,768 B2
(45) Date of Patent: Sep. 22, 2009

(54) ROBOT JOINT STRUCTURE AND ROBOT FINGER

(75) Inventors: Takeki Shirai, Tokyo (JP); Kaoru Hoshide, Tokyo (JP); Koji Ozawa, Tokyo (JP)

(73) Assignee: THK Co., Ltd., Tokyo (JP)

( * ) Notice: Subject to any disclaimer, the term of this patent is extended or adjusted under 35 U.S.C. 154(b) by 224 days.

(21) Appl. No.: 11/667,447

(22) PCT Filed: Nov. 1, 2005

(86) PCT No.: PCT/JP2005/020112

§ 371 (c)(1),
(2), (4) Date: May 10, 2007

(87) PCT Pub. No.: WO2006/054443

PCT Pub. Date: May 26, 2006

(65) Prior Publication Data

US 2008/0127768 A1 Jun. 5, 2008

(30) Foreign Application Priority Data

Nov. 17, 2004 (JP) .............................. 2004-333674

(51) Int. Cl.
*B25J 9/18* (2006.01)

(52) U.S. Cl. .................... 318/568.11; 700/254; 901/14; 901/15; 901/16; 901/17; 901/19; 901/28; 901/29; 901/30

(58) Field of Classification Search ............ 318/568.11; 700/245, 261, 900; 623/60, 61, 64; 901/1, 901/14–19, 28–30
See application file for complete search history.

(56) References Cited

U.S. PATENT DOCUMENTS 5,197,846 A * 3/1993 Uno et al. .................... 414/731

FOREIGN PATENT DOCUMENTS

JP 05-092377 A 4/1993

(Continued)

OTHER PUBLICATIONS

International Search Report of PCT/JP2005/020112, date of mailing Feb. 7, 2006.

*Primary Examiner*—Rita Leykin
(74) *Attorney, Agent, or Firm*—Westerman, Hattori, Daniels & Adrian, LLP.

(57) ABSTRACT

A robot joint structure α is composed of a metacarpal member 30 and a proximal member 40 swingably connected through a hinge 31 to a side end portion of the metacarpal member 30. The proximal member 40 includes a linear guide device 44 for an MP joint having a moving member movable in association with a self swing motion thereof, and by connecting a rod 32a and the moving member through a link mechanism 50, a driving force of an air-cylinder 32 is transmitted to the proximal member 40. On the other hand, a second robot joint structure β is also provided with linear guide devices 48, 66, 74 and link mechanisms 69, 75, to which a driving force of the air-cylinder 62 is transmitted through a drive shaft 63 in association with a rod 62a. A robot finger is constructed by the first and second robot joint structures. According to such structures, smooth joint motion can be realized, and the robot joint structure and the robot finger having improved gripping force can be provided.

10 Claims, 5 Drawing Sheets

FOREIGN PATENT DOCUMENTS

| | | |
|---|---|---|
| JP | 08-126984 A | 5/1996 |
| JP | 10-217158 A | 8/1998 |
| JP | 2002-113681 A | 4/2002 |
| JP | 2003-117873 A | 4/2003 |
| JP | 2005-169602 A | 6/2005 |
| JP | 2005169602 * | 6/2005 |

* cited by examiner

ROBOT JOINT STRUCTURE AND ROBOT FINGER

FIELD OF THE INVENTION

The present invention relates to a robot joint structure and a robot finger formed by combining the robot joint structures, and more particularly, relates to a robot joint structure and robot finger capable of realizing a smooth joint movement or operation and improving gripping force thereof.

BACKGROUND ART

Joints of human fingers are the most important parts of an upper extremity for gripping an article, and are most fundamental hinge joints, and it is said that when function of the finger joint is damaged, almost all functions of the upper extremity will be lost, and accordingly, the finger joints are very important parts of a human fingers for gripping an article.

A basic structure of the fingers will be explained with reference to structures of second to fifth fingers (i.e., forefinger, long finger, annular finger and little finger). As shown in FIG. 6 showing a bone structure of a human hand, fingers of a human has, from its root side, a metacarpal phalanx 10, proximal phalanx 12, a middle phalanx 14, and a distal phalanx 16 in the described order, and finger joints as jointing portions of these phalanxes are composed, respectively of a metacarpal proximal segment joint 11 (called MP joint, hereinlater), a proximal middle segment joint 13 (called PIP joint, hereinlater), and a middle distal segment joint 15 (called DIP joint, hereinlater). A part of the metacarpal born is called metacarpus 20, a part of the proximal phalanx 12 is called proximal segment 22, a part of the middle phalanx 14 is called middle segment 24, and a part of the distal phalanx 16 is called distal segment 26.

Since the structure of the finger is very complicated, its movement is also complicated. For example, although the MP joint 11 of the root portion of the finger can be moved independently alone, the PIP joint 13 and the DIP joint 15 disposed on the front side of the MP joint are moved in association with each other. That is, when a finger is bent in an unintentional natural manner, the PIP joint 13 is first bent and the DIP joint 15 is thereby bent. Accordingly, the human finger the proximal segment 22, the middle segment 24 and the distal segment 26 are entirely integrally bent with the MP joint 11 being fulcrum, and on the other hand, the proximal segment 22, the middle segment 24 and the distal segment 26 are bent with the PIP joint 13 and DIP joint 15 being fulcrums, respectively. Such movements of the finger will be realized in association with complicated movement of muscles.

Incidentally, it is conventionally required to reproduce human fingers, which have complicated structures and are operated complicated manner, as a robot, and to have the robot to do various workings in place of the human fingers. If such robot as is provided with the functions of the human fingers is utilized for the workings at an undesirable environment having high temperature and high humidity, or a portion in which radiation is radiated, and in a specific environment such as outer space, working efficiency, safety working environment or like can be improved as well as reduction of running cost. In consideration of such circumstances, various joint structures of robots have been proposed.

For example, Patent Publication 1, mentioned hereinafter, discloses a robot in which rotation shafts of motor driving arms are provided in parallel with a central axis of swing motion of the arms. In this joint structure, a joint portion is constructed by supporting, to be swingable, a second arm to the front end portion of a first arm, the motor is disposed on the central axis of the swing motion at this joint portion, and rotating motion of the motor is transmitted to the first or second arm through a reduction mechanism including a spa gear and so on to thereby apply the swing motion in response to the rotating direction and rotating amount of the motor to these arms.

In addition, Patent Publications 2 and 3, mentioned hereinafter, disclose structures in which first and second arms are connected to be swingable by means of a link mechanism, and the first arm is swung with respect to the second arm by using a ball screw to a portion of such link mechanism and rotating the ball screw by driving the motor. For example, in a joint structure disclosed in the Patent Publication 2, the second arm is supported to be swingable with respect to the first arm, but the second arm is provided with a screw shaft in parallel with the second arm, and the screw shaft is rotated by driving the motor mounted to the second arm. In addition, a nut member is screwed with the screw shaft mentioned above, and an end portion of a link plate extending from the first arm is jointed to the nut member to be rotatable. According to this structure, when the motor is driven, the nut member is moved on the screw shaft in accordance with the rotating amount and the rotating direction of the motor. However, since the end portion of the link plate is jointed to this nut member, pushing or pulling force in response to the movement of the nut member acts to the second arm from the link plate, whereby the second arm causes the swing motion with respect to the first arm.

Patent Publication 1: Japanese Unexamined Patent Application Publication No. HEI 05-092377

Patent Publication 2: Japanese Unexamined Patent Application Publication No. HEI 10-217158

Patent Publication 3: Japanese Unexamined Patent Application Publication No. 2002-113681

DISCLOSURE OF THE INVENTION

Problem to be Solved by the Invention

The joint structure disclosed in the above Patent Publication 1 includes the rotating shaft of the motor in parallel with the central axis of the swing motion, so that the structure itself is made very simple. However, in this structure, the motor and the reduction mechanism for driving the arms are expanded largely outward of the joint portion, so that this joint structure of the Patent Publication 1 is suitable for a joint structure of a large industrial robot weighting on rigidity or maintenance performance, but is not suitable for a small-sized joint structure such as a finger structure of a mechanical hand or like.

On the other hand, in the joint structure disclosed in the above Patent Publication 2, the link plate is pushed or pulled by the movement of the nut member in association with the rotation of the screw shaft, thereby swinging the second arm with respect to the first arm. However, such pushing or pulling force acting to the link plate at the time of the swinging motion does not accord with the moving direction of the nut member. For this reason, when the second arm performs the swinging motion, a bending moment acts to the screw shaft, and accordingly, a sufficient force for the swing motion of the second arm is not applied even if rigidity of the screw shaft is increased by, for example, making large a shaft diameter, thus being inconvenient.

Furthermore, in a case where robot fingers of a mechanical hand gripping an article is constructed by using the joint structure disclosed in the Patent Publication 2, a reaction force caused at the time of gripping the article acts, as a bending moment, on the screw shaft through the link plate, so that if a sufficient rigidity of the screw shaft is not ensured, the robot finger cannot achieve a sufficient gripping force. However, if the rigidity of the screw shaft with respect to the bending moment increases, the joint structure will be itself enlarged and will increase in its weight. Therefore, it is impossible to construct robot fingers having small size and light weight, which provides a problem. In addition, for such robot fingers, it is necessary to locate the ball screw as driving means for each joint, so that the number of objects or portions to be controlled will increase, thus being inconvenient.

The present invention was achieved in consideration of the above matters, and an object of the present invention is to provide a robot joint structure and a robot finger(s) realizing an improved smooth joint motion and being improved in a gripping force.

Means for Achieving the Object

A robot joint structure of the present invention is characterized by comprising: a metacarpal member having a reference surface; a metacarpal member side driving unit mounted on the reference surface so as to push or pull a movable member in a direction substantially parallel with the reference surface; a proximal member connected to be swingable to a side end portion of the metacarpal member through a hinge; and a linear guide device for an MP joint provided with a moving member movable in association with the swing motion of the proximal member, wherein the movable member and the moving member are connected through a link mechanism, and the proximal member is swung in accordance with the push/pull motion of the movable member by the metacarpal member side driving unit.

In the robot joint structure according to the present invention, the metacarpal member may be provided with a linear guide device for the metacarpal member connected to the movable member and having a moving member movable in the same direction of that of the movable member, so that the linear guide device for the metacarpal member guides the movable member.

Furthermore, in the robot joint structure according the present invention, the link mechanism may include a rotary bearing, a bearing case mounted to the moving member in a manner such that an outer race side of the rotary bearing is fixedly accommodated in the bearing case, and a link shaft fitted to be rotatable in an inner race of the rotary bearing so as to be connected to the movable member.

Still furthermore, in the robot joint structure according to the present invention, the metacarpal member side driving unit may be an air-cylinder as a movable member pushing or pulling a rod.

In another aspect, a robot joint structure of the present invention is characterized by comprising: a proximal member; a metacarpal member connected swingably to the proximal member through a hinge; and a distal member connected to the metacarpal member through a hinge to be swingable in a same direction as a swinging direction of the metacarpal member, wherein the metacarpal member includes a metacarpal member side driving unit pushing or pulling the movable member, and a drive shaft connected to the movable member and moved in a same direction as that of the movable member in association with the pushing or pulling motion thereof, the proximal member and the distal member are respectively provided with a linear guide device for a PIP joint and a linear guide device for a DIP joint having, to connection side surfaces to be connected to the metacarpal member, moving members movable in association with self swing motions thereof, and both end portions of the drive shaft are connected respectively to the moving members of the linear guide devices for the PIP joint and the DIP joint through link mechanisms, respectively, so that the proximal member and the distal member are swung in association with the push/pull motion of the movable member by the metacarpal member side driving unit.

Furthermore, in the robot joint structure according to the above present invention, the metacarpus member may be provided with a linear guide device for the metacarpal member connected to the movable member and having a moving member movable in the same direction of that of the movable member, so that the linear guide device for the metacarpal member guides the movable member.

Still furthermore, in the robot joint structure according to the above present invention, the link mechanism may include a rotary bearing, a bearing case mounted to the moving member in a manner such that an outer race side of the rotary bearing is fixedly accommodated in the bearing case, and a link shaft fitted to be rotatable in an inner race of the rotary bearing so as to be connected to the movable member.

Still furthermore, in the robot joint structure according to the present invention, the metacarpal member side driving unit may be an air-cylinder as the movable member pushing or pulling a rod.

In addition, it may be possible to provide a robot finger comprising, in combination, the robot joint structure according to one embodiment of the present invention and the robot joint structure according to another embodiment of the present invention mentioned above.

Further, it is also to be noted that, in the above present invention, all the necessary features of the present invention is not recited, and sub-combinations of these features will constitute the present invention.

Effects of the Invention

According to the present invention, an operation of a joint structure as like as a human finger can be realized, and in addition, a robot joint structure and a robot finger having improved gripping force can be provided.

REFERENCE NUMERALS

10 - - - metacarpal phalanx, 11 - - - MP joint, 12 - - - proximal phalanx, 13 - - - PIP joint, 14 - - - middle phalanx, 15 - - - DIP joint, 16 - - - distal phalanx, 20 - - - metacarpus, 22 - - - proximal segment, 24 - - - middle segment, 26 - - - distal segment, 30 - - - metacarpal member, 31a - - - reference surface, 31, 61, 71 - - - hinge, 32, 62 - - - air cylinder, 32a, 62a - - - rod, 40 - - - proximal member, 40a, 40b, 70a - - - connection side end surface, 42, 46, 55, 64, 72 - - - moving member, 42a - - - recessed groove, 43, 56, 65 - - - track rail, 43a - - - ball rolling groove, 44 - - - linear guide device for MP joint, 45 - - - ball, 48 - - - linear guide device for PIP joint, 50, 69, 75 - - - link mechanism, 51 - - - rotating bearing, 52 - - - bearing case, 53, 58 - - - connection member, 54 - - - link shaft, 57 - - - linear guide device for metacarpus, 63 - - - drive shaft, 66 - - - linear guide device for middle segment, 70 - - - distal member, 74 - - - linear guide device for DIP joint.

BEST MODE FOR EMBODYING THE INVENTION

Hereunder, a preferred embodiment for embodying the present invention will be explained with reference to the accompanying drawings. The following embodiment does not limit the invention to one recited in respective claims, and all the combinations of characteristic features described in the embodiment is not essential as means for achieving the invention.

Figure 1A:
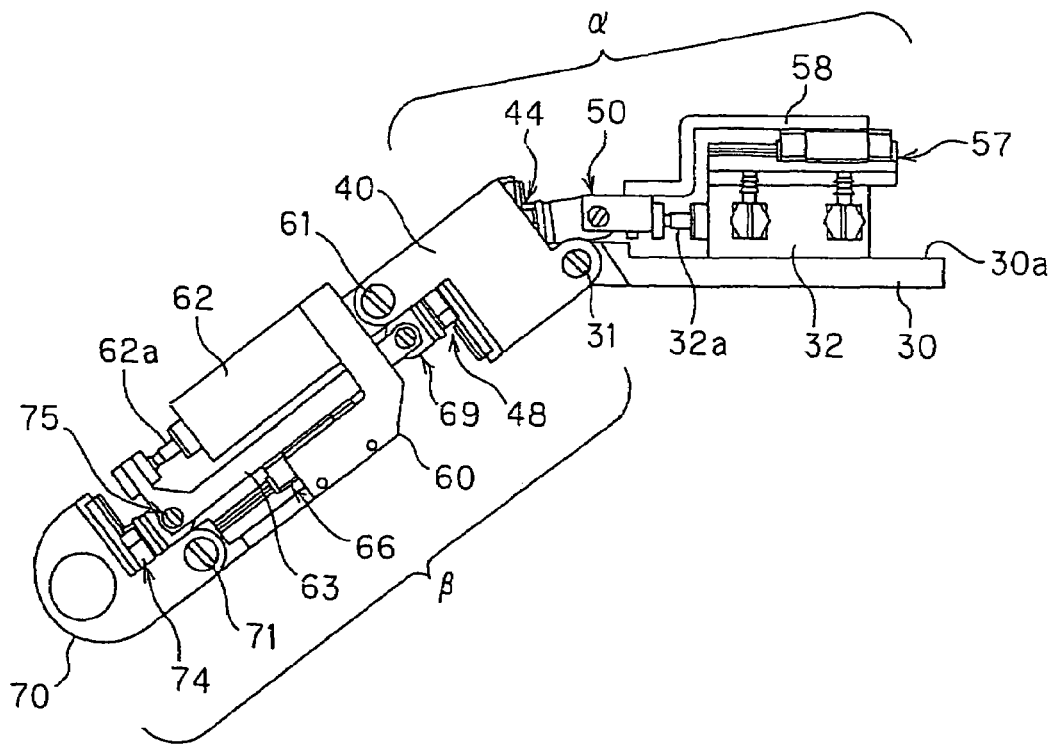
FIG. 1A is a side view showing a robot finger according to one embodiment of the present invention, and particularly, showing the robot finger in its home position.
Figure 1B:
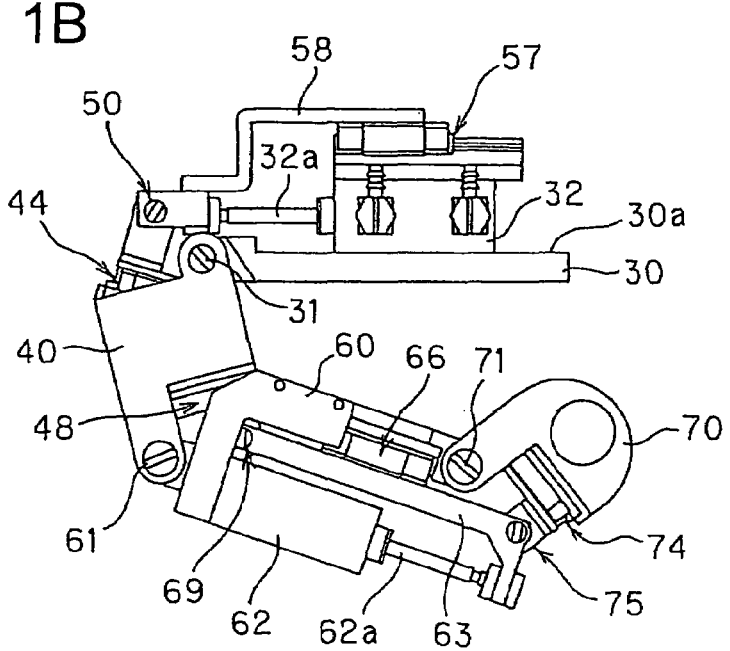
FIG. 1B is a side view of the robot arm according to one embodiment of the present invention in which the robot finger is driven to a position from the position shown in FIG. 1A, suitable for gripping an article.

FIGS. 1A and 1B are views showing the side surface of a robot finger according to the embodiment of the present invention, and especially, FIG. 1A shows a state that the robot finger is positioned at its home position, and FIG. 1B shows a state that the robot finger is driven and moved to a position at which it grips an article.

The robot finger according to the embodiment is provided with two driving means, so that the robot finger is composed of two kinds of robot joint structures.

At first, a first robot joint structure is denoted by a character "α" on FIG. 1A, which corresponds to a metacarpus 20, an MP joint 11 and a proximal segment 22 of a human finger. On the other hand, a second robot joint structure is denoted by a character "β" on FIG. 1A, which corresponds to the proximal segment 22, a PIP joint 13, a middle segment 24, a DIP joint 15 and a distal segment 26. These first and second robot joint structures are provided with independent driving means, respectively, so as to give driving motions to the first and second robot joint structures so as to be operated as like as human fingers. These robot joint structures will be described hereunder, respectively.

[First Robot Joint Structure]

Figure 2:
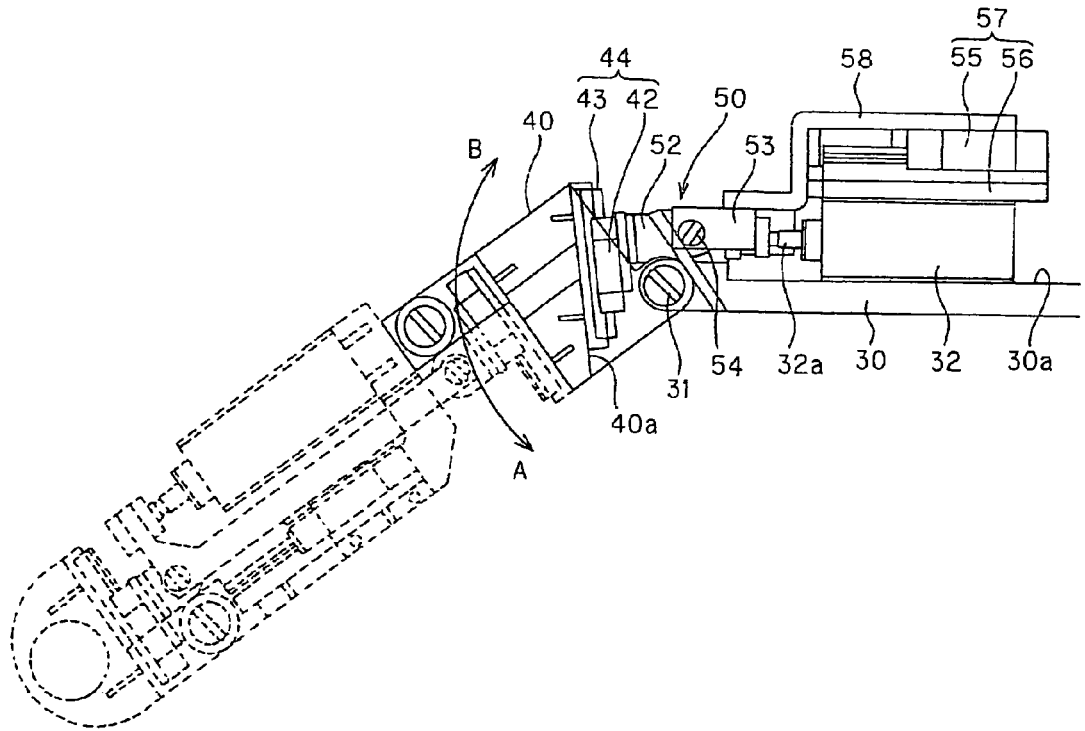
FIG. 2 is a side perspective view for explaining a first robot joint structure according to the embodiment of the present invention.

FIG. 2 is a side perspective view for explaining the first robot joint structure according to the present embodiment. The first robot joint structure of the present embodiment is provided with the metacarpus member 30 having a reference surface 30a, and a proximal member 40 connected to be swingable to the side end portion of the metacarpal member 30 by means of hinge 31. In comparison, the metacarpus member 30 corresponds to the metacarpus of a human finger structure, the hinge 31 corresponds to the MP joint 11, and the proximal member 40 corresponds to the proximal segment 22.

An air-cylinder 32 is mounted to the reference surface 30a of the metacarpal member 30 as metacarpal segment driving means capable of pushing or pulling a rod 32a as movable member in a direction approximately parallel with the reference surface 30a. This air-cylinder 32 operates such that the rod 32a is pushed forward through air-supply and is pulled back through air-suction.

On the other hand, to the side end surface 40a of the proximal member 40 to be connected with the metacarpal member 30, there is mounted a linear guide device 44 for the MP joint provided with a moving member 42 movable in accordance with the swinging motion of the proximal member 40. This linear guide device 44 for the MP joint preferably employ a general linear guide device such as shown in FIG. 3A, for example.

Figure 3A:
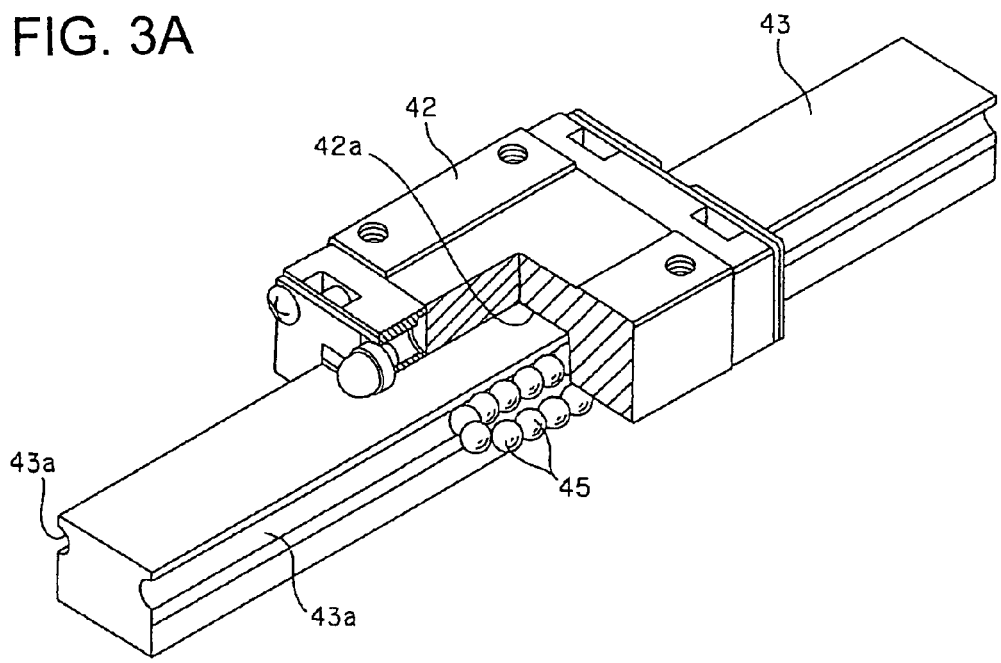
FIG. 3A is a view showing one example of a general linear guide device to which the present embodiment is preferably applicable.

In the case where the linear guide device shown in FIG. 3A is adopted, a track rail 43 formed in a rectangular shape in section is first fixed, by connection means such as bolt, to the connection side end surface 40a of the proximal member 40. Herein, ball rolling grooves 43a along which balls 45, 45, - - - roll in the longitudinal direction are formed to both side surfaces of the track rail 43. In addition, the moving member 42 is formed so as to provide a channel shape having a recessed groove 42a, and the track rail 43 is idly fitted into the recessed groove 42a. Further, the recessed groove 42a is formed, at its inside surface, with a loaded rolling surface groove opposing to the ball rolling groove 43a of the track rail 43 so that a load acting to the track rail 43 and the moving member 42 is supported while the balls 45, 45, - - - roll between the ball rolling groove 43a of the track rail 43 and the loaded rolling groove of the moving member 42. In addition, an endless circulation passage of the balls 45, 45, - - - is formed to the moving member 42, and through the circulation of the balls 45, 45, - - - in the endless circulation passage, the moving member 42 can be moved to the axial direction with respect to the track rail 43.

Further, the linear guide device 44 for the MP joint used for the present embodiment is set at an inclination with respect to the reference surface 30a of the metacarpal member 30. This is because the home position of the proximal member 40 of the present embodiment is set so as to be directed obliquely downward as shown in FIG. 1A, and is set in consideration of the smooth swinging motion of the proximal member 40. The setting angle of the linear guide device 44 for the MP joint will be optionally set in accordance with the whole construction of the robot joint structure and an object to be gripped.

Figure 3B:
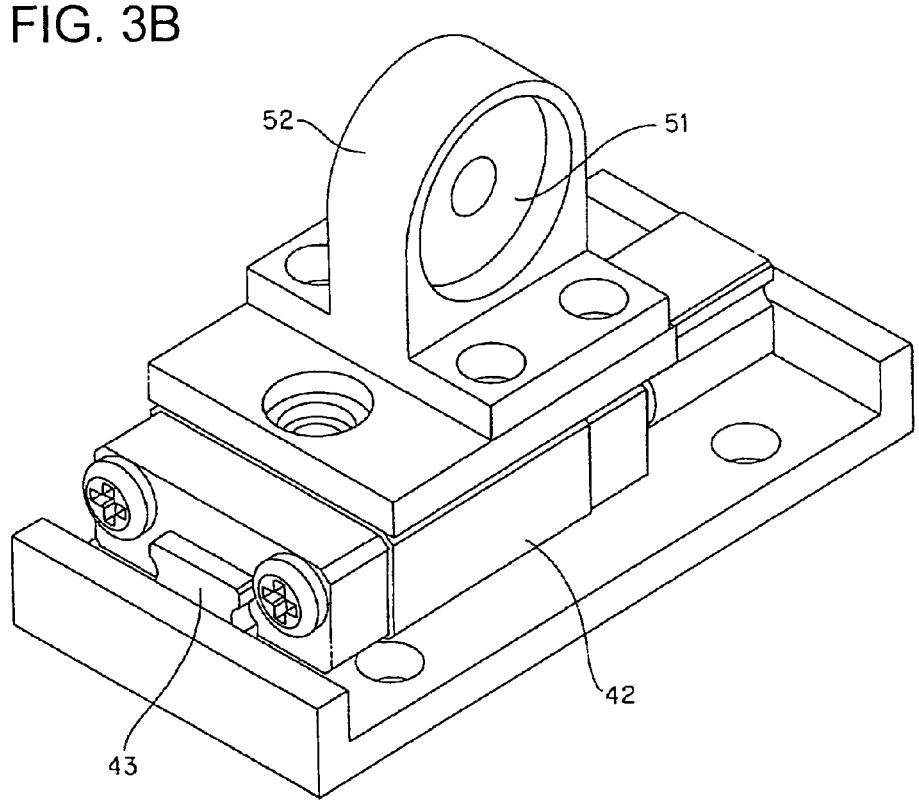
FIG. 3B is a view showing a structure of a link mechanism according to the embodiment of the present invention.

Furthermore, in the first robot joint structure of this embodiment, the rod 32a and the moving member 42 are connected with each other through a link mechanism 50. This link mechanism 50 includes a bearing case accommodating a rotary bearing 51 and a link shaft 54 connected to the rotary bearing 51. The link mechanism 50 will be explained further in detail with reference to FIGS. 2 and 3B. That is, the bearing case 52 is fixedly mounted to the movable member 42, and the rotary bearing 51 is accommodated in the bearing case 52 in a state that an outer race side is fixed. On the other hand, the link shaft 54 connected to the rod 32a through the connection member 53 is disposed on the rod 32a side so that the link shaft is fitted in the inner race of the rotary bearing 51 to be rotatable. Therefore, the pushing force from or pulling-back force to the rod 32a is transferred to the rotary bearing through the link shaft 54, which is then transferred to the moving member 42.

According to the structures mentioned above, the proximal member 40 is swung in accordance with the push/pull motion of the rod 32a of the air-cylinder 32. That is, when the rod 32a is pushed forward by supplying air, the moving member 42 is subjected to the pushing force from the rod 32a, and according to this pushing force, the proximal member 40 is swung in an arrowed direction A with the hinge 31 being the center of rotation (see FIG. 2). Then, the pushing force of the rod 32a is transferred to the moving member 42 through the link mechanism 50, and the moving member 42 moves in association with the swing motion of the proximal member 40, thus realizing the smooth swinging motion of the proximal member 40.

On the contrary, when the rod 32a is pulled back by the suction of the air, the moving member 42 is subjected to the pull-back force from the rod 32a, and according to this pull-back force, the proximal member 40 is swung in an arrowed direction B with the hinge 31 being the center of the rotation. At this time, similarly, the pull-back force of the rod 32a is transferred to the moving member 42 through the link mechanism 50, and the moving member 42 moves in association with the swinging motion of the proximal member 40, thus realizing the smooth swinging motion of the proximal member 40.

Furthermore, a linear guide device 57 for the metacarpal member 30 provided with the moving member 55 movable in the same direction in connection with the rod 32a is provided for the metacarpal member of the first robot joint structure according to the present embodiment. For this linear guide device 57 for the metacarpal member, it is preferred to adopt a general linear guide device such as shown in FIG. 3A. In a more specific example, as shown in FIG. 2, the track rail 56 provided for the linear guide device 57 for the metacarpal member is fixed to the body of the air-cylinder 32. Further, the rod 32a and the moving member 55 are connected via the connection member 58, and the moving member 55 is constructed to be movable in the same direction as that of the rod 32a in accordance with the push/pull operation of the rod 32a. The moving member 55 receives a portion of load or moment according to the swinging motion of the proximal member 40 added to the rod 32a. That is, the linear guide device 57 for the metacarpal member reduces the load to be applied to the rod 32a and contributes to the stable operation of the first robot joint structure.

[Second Robot Joint Structure]

Hereunder, the second robot joint structure according to the present embodiment will be described with reference to FIGS. 4 and 5.

Figure 4:
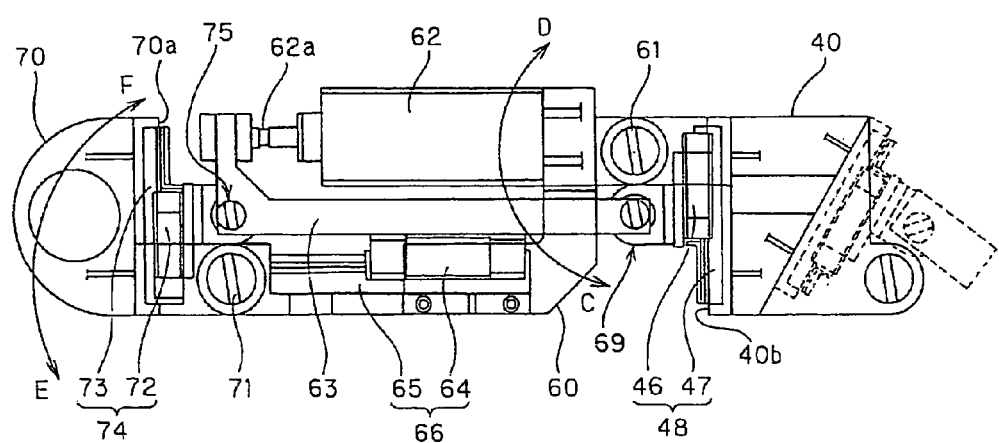
FIG. 4 is a side perspective view for explaining a second robot joint structure according to the embodiment of the present invention.
Figure 5:
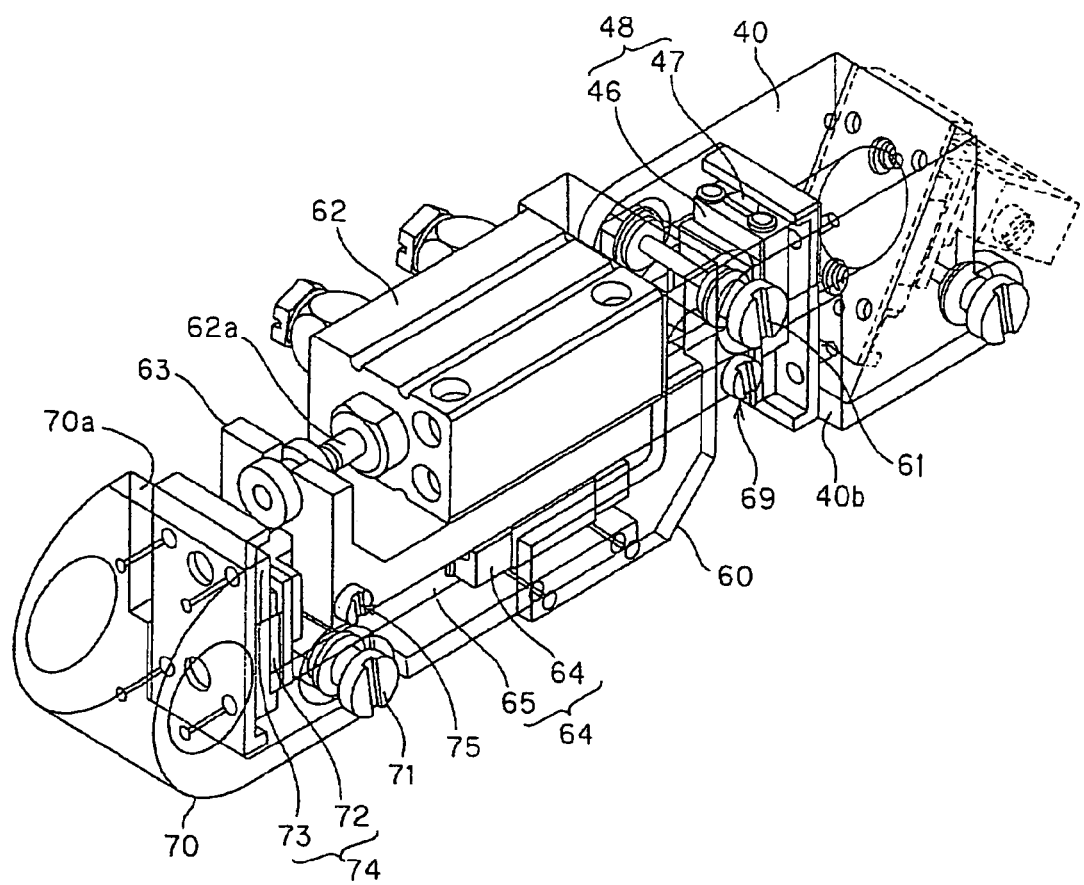
FIG. 5 is a perspective view for explaining the second robot joint structure according to the embodiment of the present invention.
Figure 6:
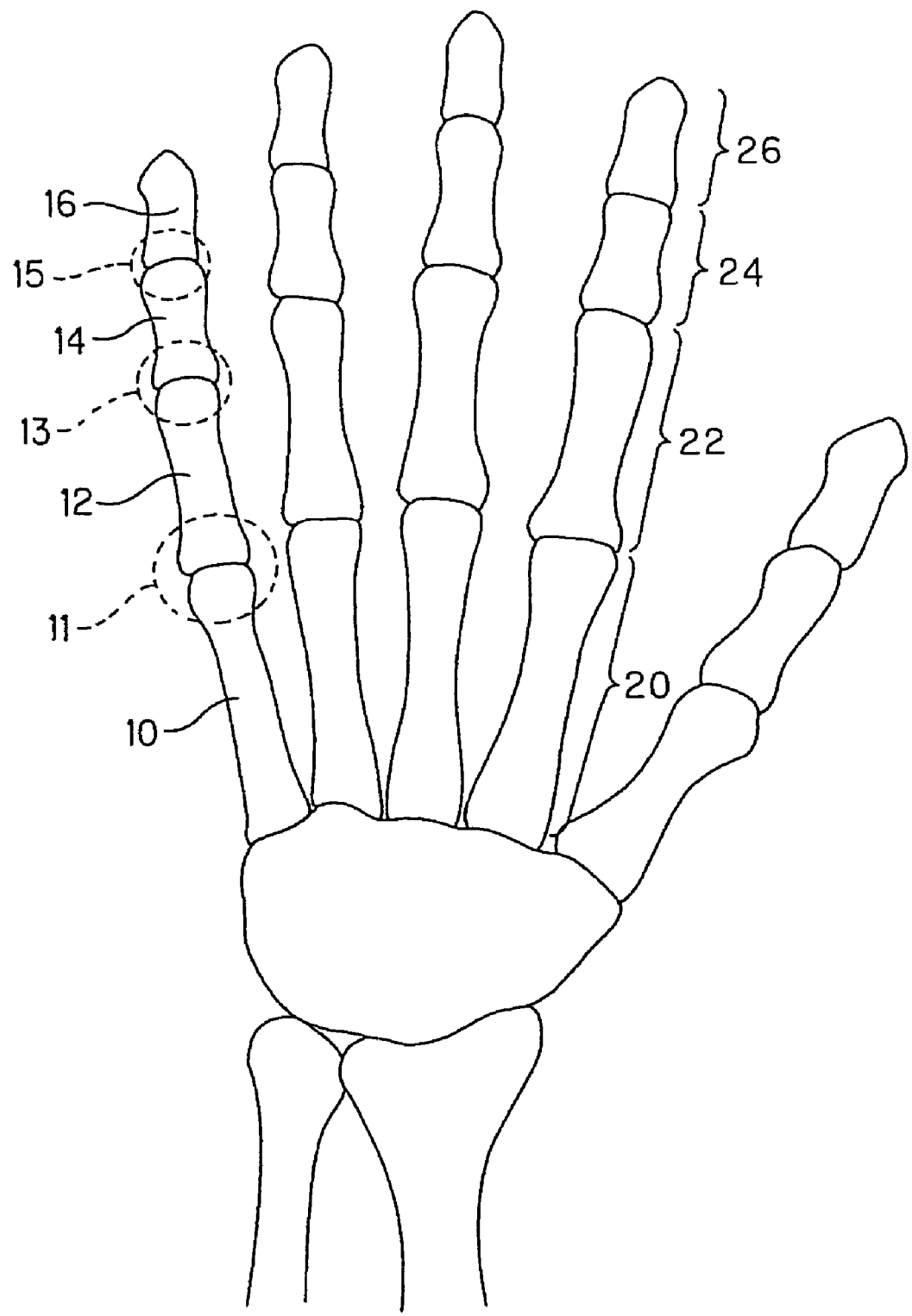
FIG. 6 is a view showing a born structure of a human hand for explaining respective parts of fingers.

FIG. 4. is a side perspective view for explaining the second robot joint structure according to the present embodiment, and FIG. 5 is a oblique perspective view for explaining the second robot joint structure according to the present embodiment. The second robot joint structure includes the proximal member 40, the middle member 60 swingably connected to the proximal member 40 via the hinge 61, and the distal member 70 connected, to be swingable in the same direction as the swinging direction of the middle member 60, to the middle member 60 via the hinge 71. These members and segments correspond to the human finger or finger parts such that the proximal segment 40 corresponds to the proximal portion 22, the hinge 61 corresponds to the PIP joint 13, the middle member 60 corresponds to the middle segment 24, the hinge 71 corresponds to the DIP joint 15, and the distal member 70 corresponds to the distal segment 26.

The middle member 60 is provided with an air-cylinder 62 as a middle member side driving means performing the push/pull motion of a rod 62a as a moving member, and a drive shaft 63 connected to the rod 62a and movable in the same direction in association with the push/pull movement of the rod 62. The air-cylinder 62 pushes the rod 62a by supplying the air, and the rod 62a is pulled back by the suction of the air. Further, in this time, a moving member 64 movable in the same direction of that of the drive shaft 63 is connected to the drive shaft 63. This moving member 64 is a member movable on a driving rail 65 fixedly placed to the middle member 60, and constitutes, together with the driving rail 65, the linear guide device 66 for the middle member. The moving member 64 guides the movement of the drive shaft 63 and realizes the stable motion in association with the rod 62a.

Furthermore, the proximal member 40 and the distal member 70 disposed on both ends so as to sandwich the middle member 60 are provided with the PIP joint linear guide device 48 and the DIP joint linear guide device 74, respectively, which are provided with the connection side end surfaces 40b and 70a and the moving members 46 and 72 movable in accordance with the self swing motion, respectively. Both the end portions of the drive shaft 63 are connected, through link mechanisms 69 and 75, respectively to the moving members 46 and 72 provided for these PIP joint linear guide device 48 and the DIP joint linear guide device 74, respectively.

That is, when the rod 62a is pushed out by the supply of the air, the drive shaft 63 moves in the left side on the drawing paper of FIG. 4, so that the moving member 46 receives the pull-back force on the proximal member 40 side and moves downward in the downward direction on the drawing paper, and as a result, the proximal member 40 is swung in an arrowed direction C with the hinge 61 being the center of this swing motion. On the other hand, on the distal member 70 side, the movable member 72 is subjected to the push-out force and moves in the upper direction on the drawing paper, and as a result, the distal member 70 is swung in an arrowed direction E with the hinge 71 being the center of this swung motion. At this time, the pull-back force and push-out force of the drive shaft 63 are transferred to the moving members 46 and 72 through the link mechanisms 69 and 75, respectively, and the moving members 46 and 72 can be moved in response to the swinging motions of the proximal member 40 and the distal member 70, thus realizing the smooth swinging motions of the proximal member 40 and the distal member 70.

On the contrary, when the rod 62a is pulled back by the suction of the air, the drive shaft 63 moves rightward on the drawing paper in the state shown in FIG. 4, so that the moving member 46 on the side of the proximal member 40 receives the pushing force and is hence moved in the upper direction on the drawing paper in the state shown in FIG. 4. As a result, the proximal member 40 swings in an arrowed direction D with the hinge 61 being the center of the rotation. On the other hand, on the side of the distal member 70, the pull-back force is applied to the moving member 72, which is then moved downward direction on the drawing paper, and as a result, the distal member 70 is swung in an arrowed direction F with the hinge 71 being the center of the rotation. At this time, the moving members 46 and 72 are subjected to the push-out and pull-back forces of the drive shaft 63 through the operation of the link mechanisms 69 and 75, respectively, and the moving members 46 and 72 can be moved in accordance with the swinging motions of the proximal member 40 and the distal member 70, thus realizing the smooth swinging motion of the proximal member 40 and the distal member 70.

Further, the link mechanisms 69 and 75 have substantially the same structures as that of the link mechanism 50 mentioned with reference to the first robot joint structure, so that the detail explanations thereof are omitted herein. Likely as in the first robot joint structure, it is preferred to adopt a general linear guide device such as shown in FIG. 3A utilized for the linear guide device 48 for the PIP joint, the linear guide device 66 for the middle segment and the linear guide device 74 for the DIP joint.

[Robot Finger]

Hereinabove, two kinds of robot joint structures of first and second robot joint structures are explained as exemplary embodiment of the present invention. Incidentally, the respective robot joint structures are provided with the common proximal member 40, and these first and second robot joint structures can be assembled by means of this common proximal member 40, for example, into a robot finger having a structure shown in FIGS. 1A and 1B.

That is, the metacarpal member 30, the hinge 31, the proximal member 40, the hinge 71 and the distal member realize the human finger structure of the metacarpal segment 20, the MP joint 11, the proximal segment 22, the PIP joint 13, the metacarpal segment 24, the DIP joint 15 and the distal segment 26, and the functions of muscle fibers of the fingers are achieved by the two air-cylinders, 32, 62, the drive shaft 63, three link mechanisms 50, 69, 75 and the five linear guide devices 44, 48, 57, 66, 74.

In the first and second robot joint structures and the robot fingers of the present embodiment described above, the example employing the air-cylinders 32 and 62 as driving means is explained. Such employment of the air-cylinders 32, 62 is derived from the fact that a strong gripping force is relatively easily obtainable. Further, in the air-cylinders 32, 62, although the robot joint structure and the movement of the robot fingers are limited to the two operations of "gripping" and "releasing" operations, the driving means applicable to the present invention is not limited to the air-cylinders 2, 62. For example, a driving mechanism such as electric cylinder, motor and the like may be adopted. In a case, for example, of employing a stepping motor, a robot joint structure excellent in attitude maintenance and positional controlling may be realized.

Moreover, the driving means on the metacarpal member side and the middle segment side may perform the same controlling operation or different controlling operations. For example, as in the present embodiment, in the case where the air-cylinders 32, 62 are utilized, four kinds of operations can be achieved such as "gripping" by the simultaneous air supply (condition shown in FIG. 1B), "releasing" by the simultaneous air suction (condition shown in FIG. 1A), "bending only of robot finger root portion" by the air supply only to the air cylinder 32, and "bending only of robot finger end portion" by the air supply only to the air-cylinder 62. In addition, by adopting a motor or like as the driving means having high operation stopping performance and high reaction rate, the robot operation more resembling the human finger operation can be realized.

Hereinabove, although the preferred embodiment of the present invention was described, the technical scope of the described embodiment is not limited to the described range thereof, and various alternations or changes may be applied to the embodiment. For example, in the present embodiment, although the robot finger is composed of the air-cylinders, the linear guide devices and the link mechanisms, a range or scope to which the technical idea of the present invention is applicable is not limited to the human finger structure, and it may be possible to apply to every joint structure including a lower leg structure including foot, ankle or like and an animal joint structure. It is further apparent from the recitation of appended claims that embodiments including the above alternations or changes may be included in the technical scopes of the present invention.

The invention claimed is:

1. A robot joint structure comprising:
a metacarpal member having a reference surface;
a metacarpal member side driving unit mounted on the reference surface so as to push or pull a movable member in a direction substantially parallel with the reference surface;
a proximal member connected to be swingable to a side end portion of the metacarpal member through a hinge; and
a linear guide device for a metacarpal proximal segment joint provided with a moving member movable in association with the swing motion of the proximal member,
wherein the movable member and the moving member are connected through a link mechanism, and the proximal member is swung in accordance with the push/pull motion of the movable member by the metacarpal member side driving unit.

2. The robot joint structure according to claim 1, wherein the metacarpal member is provided with a linear guide device for the metacarpal member connected to the movable member and having a moving member movable in the same direction of that of the movable member, so that the linear guide device for the metacarpal member guides the movable member.

3. The robot joint structure according to claim 1, wherein the link mechanism includes a rotary bearing, a bearing case mounted to the moving member in a manner such that an outer race side of the rotary bearing is fixedly accommodated in the bearing case, and a link shaft fitted to be rotatable in an inner race of the rotary bearing so as to be connected to the movable member.

4. The robot joint structure according to any one of claims 1 to 3, wherein the metacarpal member side driving unit is an air-cylinder pushing or pulling a rod as the movable member.

5. A robot joint structure comprising:
a proximal member;
a metacarpal member connected swingably to the proximal member through a hinge;
a distal member connected to the metacarpal member through a hinge to be swingable in a same direction as a swinging direction of the metacarpal member,
wherein the metacarpal member includes a metacarpal member side driving unit pushing or pulling the movable member, and a drive shaft connected to the movable member and moved in a same direction as that of the movable member in association with the pushing or pulling motion thereof,
the proximal member and the distal member are respectively provided with a linear guide device for a proximal middle segment joint and a linear guide device for a middle distal segment joint having, to connection side surfaces to be connected to the metacarpal member, moving members movable in association with self swing motions thereof, and
both end portions of the drive shaft are connected respectively to the moving members of the linear guide devices for the proximal middle segment joint and the middle distal segment joint through link mechanisms, respectively, so that the proximal member and the distal member are swung in association with the push/pull motion of the movable member by the metacarpal member side driving unit.

6. The robot joint structure according to claim 5, wherein the metacarpal member is provided with a linear guide device for the metacarpal member connected to the movable member and having a moving member movable in the same direction of that of the movable member, so that the linear guide device for the metacarpal member guides the movable member.

7. The robot joint structure according to claim 5, wherein the link mechanism includes a rotary bearing, a bearing case mounted to the moving member in a manner such that an outer race side of the rotary bearing is fixedly accommodated in the bearing case, and a link shaft fitted to be rotatable in an inner race of the rotary bearing so as to be connected to the movable member.

8. The robot joint structure according to any one of claims 5 to 7, wherein the metacarpal member side driving unit is an air-cylinder pushing or pulling a rod as the movable member.

9. A robot finger comprising, in combination, the robot joint structure according to any one of claims 1 to 3 and a robot joint structure comprising:

a proximal member;

a metacarpal member connected swingably to the proximal member through a hinge;

a distal member connected to the metacarpal member through a hinge to be swingable in a same direction as a swinging direction of the metacarpal member, wherein the metacarpal member includes a metacarpal member side driving unit pushing or pulling the movable member, and a drive shaft connected to the movable member and moved in a same direction as that of the movable member in association with the pushing or pulling motion thereof, the proximal member and the distal member are respectively provided with a linear guide device for a proximal middle segment joint and a linear guide device for a middle distal segment joint having, to connection side surfaces to be connected to the metacarpal member, moving members movable in association with self swing motions thereof, and both end portions of the drive shaft are connected respectively to the moving members of the linear guide devices for the proximal middle segment joint and the middle distal segment joint through link mechanisms, respectively, so that the proximal member and the distal member are swung in association with the push/pull motion of the movable member by the metacarpal member side driving unit.

10. A robot finger comprising, in combination, the robot joint structure according to any one of claims 5-7, and a robot joint structure comprising:

a metacarpal member having a reference surface;

a metacarpal member side driving unit mounted on the reference surface so as to push or pull a movable member in a direction substantially parallel with the reference surface;

a proximal member connected to be swingable to a side end portion of the metacarpal member through a hinge; and a linear guide device for a metacarpal proximal segment joint provided with a moving member movable in association with the swing motion of the proximal member, wherein the movable member and the moving member are connected through a link mechanism, and the proximal member is swung in accordance with the push/pull motion of the movable member by the metacarpal member side driving unit.

* * * * *